Aug. 19, 1952  R. R. PEARSON  2,607,130
RUBBER FOOTWEAR HAVING REFLEX LIGHT-REFLECTING AREAS
Filed July 28, 1950

Inventor
Roland R. Pearson
by Roberts, Cushman & Grover
att'ys.

Patented Aug. 19, 1952

2,607,130

UNITED STATES PATENT OFFICE 2,607,130

RUBBER FOOTWEAR HAVING REFLEX LIGHT-REFLECTING AREAS

Roland R. Pearson, East Providence, R. I., assignor to Bristol Manufacturing Corporation, Bristol, R. I., a corporation of Rhode Island Application July 28, 1950, Serial No. 176,300

3 Claims. (Cl. 36—1)

This invention pertains to rubber footwear, for example children's rubber boots, overshoes, etc., and relates more particularly to rubber footwear designed to afford a measure of safety to the wearer when walking in or close to a highway after dark.

Rubber footwear is usually worn in rainy or snowy weather at a time when the wearer wears outer garments which are of rainproof or heavy-textured material, such materials usually being of a dark color. Thus the entire costume is such that it does not reflect the light of an on-coming motor vehicle to any substantial extent. The danger to a pedestrian, so clothed, is thus far more imminent than when he is dressed in outer clothing appropriate to more clement weather conditions. Since the headlights of a motor vehicle are customarily directed below the horizon, the lower extremities of a pedestrian are exposed to a greater intensity of light than the upper portions of his body, and thus if some portion, at least, of the footwear could be of light-reflecting material capable of intensely reflecting the beams from the vehicle headlights, the wearer of such footwear would be afforded a substantial measure of protection.

Extended research in highway engineering has shown that certain types of reflecting surface are far more effective than others in reflecting the beam from a vehicle headlight. Thus surfaces of the so-called "reflex" type, wherein the reflection results from a surface coating of tiny glass beads has proven to be the most desirable. Such surfaces are usually formed by partially embedding a multitude of tiny transparent beads in a cementitious binder forming a coating upon a support which is usually rigid, for example the surface of the road itself, or a wooden or metallic sign board.

The present invention has for one object the provision of an article of rubber footwear having an area of the reflex light-reflecting type which will intensely reflect the rays from a motor vehicle headlight beam and thus warn the driver of the vehicle of the presence of a pedestrian in the highway. A further object is to provide a child's rubber boot with a beaded, light-reflecting area of ornamental design adapted to enhance the appearance of the boot in the daytime and which also acts as a light reflector at night.

The uppers and tops of rubber overshoes and boots usually consist of a stretchable textile base, for example knitted stockinet fabric coated on the outside with vulcanized rubber. The base fabric must be stretchable so that the upper or top may yield in response to stresses applied in donning or doffing the shoe or boot, the rubber layer stretching with the base and elastically contracting when the stretching stress is relieved, thus tending to restore the upper or top to its initial shape and dimensions. Thus it is necessary, if the top or upper of a rubber boot or shoe is to be provided with a light reflector of the reflex type, that the support to which the beads are attached be elastically stretchable to substantially the same degree as the upper or top of the boot or shoe and further that the beads be so anchored to the support that they will not be loosened by repeated stretching and contraction of the support. Thus, a further object is to provide an article of footwear comprising elastically stretchable material with a beaded light reflector attached to and elastically stretchable to substantially the same degree as the elastic material of the article of footwear. A further object is to provide an elastically stretchable boot top with a layer of light-reflecting beads so permanently attached to the boot top that they will not fall off as the result of repeated stretching and contraction of the boot top.

Other and further objects and advantages of the invention will be pointed out in the following more detailed description and by reference to the accompanying drawings wherein Fig. 1 is a side elevation of a child's rubber boot embodying the present invention;

Fig. 6 is a section similar to Fig. 4, but showing a further modified construction;

Figure 1:
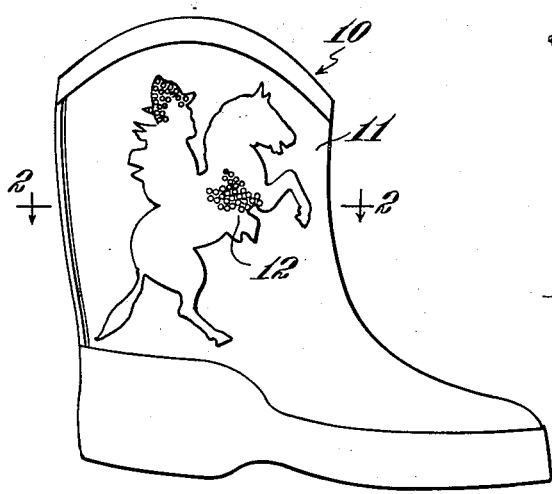

Referring to the drawings, the numeral 10 designates a child's rubber boot having the top 11 and having a reflector 12, in accordance with the present invention, attached to one or both sides of the top, preferably to the outer side, that is to say the right-hand side if the boot illustrated is to be worn on the right foot.

Figure 2:
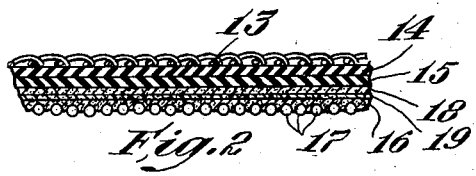
Fig. 2 is a fragmentary, diagrammatic section on the line 2—2 of Fig. 1, to large scale, illustrating a preferred construction.

In accordance with customary practice the boot top 11 comprises a base 13 (Fig. 2) of elastically stretchable textile material, for example stockinet, coated on the outside with an elastically stretchable coating 14 of vulcanized rubber.

Figure 3:
Fig. 3 is an elevation of the applique ornament shown in Fig. 1 as it appears before it is applied to the boot top.
Figure 4:
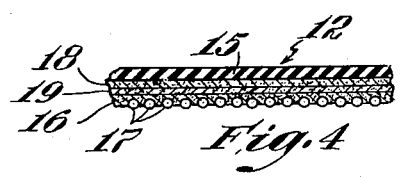
Fig. 4 is a section, to large scale, on the line 4—4 of Fig. 3.

In accordance with the present invention and as illustrated in Figs. 1 and 3, the reflector 12 is a part which is appliqued to the boot top and which, as shown in Fig. 4, comprises a supporting ply 15 of uncured rubber which, during the process of manufacture, is vulcanized to the rubber coating 14 of the boot top so as to provide an integral union between the coating 14 and the ply 15. In accordance with a preferred embodiment of the invention the outer surface of the rubber ply 15, before the latter has been cured, is coated with a transparent varnish layer 18. This transparent varnish is preferably of the type commonly known as a "long oil" varnish such as used in the printing trade in the making of ink rolls. Chemically speaking, this varnish is an alkyd resin varnish which, when fully set, is elastically stretchable and rubber-like in character. While this varnish layer 18 is still tacky it is sprinkled with a fine powder consisting of discrete opaque particles of light-reflecting character such, for example, as metallic aluminum powder, titanium oxide or the like, the powder adhering to the varnish coating to form a reflecting surface 19. After this reflecting surface has been formed and the varnish 18 has set, a second coating 16 of varnish is applied, this latter varnish coating preferably being of the type above referred to. This varnish coating 16 is allowed to set for approximately fifteen minutes at a temperature of 70° F. After this treatment it is still tacky and while in this tacky condition it is spread, by dusting, spraying, sifting or otherwise, with a coating 17 of tiny transparent glass beads of the kind commonly used in the making of reflectors of the "reflex" type. Preferably the beads employed are of very small size. These beads sink into the coating 16 so as to become partially embedded therein, although not completely submerged in the coating. The coating continues to dry thereafter until it loses its tackiness but still retains substantial elasticity. After having thus provided the ply 15 with its reflecting coating and layer of beads, it is then cut, for example by the use of a properly shaped die or otherwise, to provide a reflector 12 of the desired contour. The uncoated side of the uncured ply 15, carrying its reflecting and bead layers, is then placed in contact with the uncured rubber coating 14 of the boot top and the boot is then vulcanized, thereby integrally merging the coating 14 with the ply 15. A vulcanizing treatment of one hour and forty-five minutes at a temperature of 270° F. and under a pressure of thirty pounds per square inch has been found satisfactory for the purpose. After vulcanization, the ply 15 is an integral part of the boot top and the varnish coatings have become thoroughly dried and set, but in this condition have substantially the same degree of elastic stretch as the boot top so that regardless of repeated stretchings and contractions of the boot top, resultant from donning and doffing the boot or from the stresses imposed during wear, the elastic varnish coat 16 retains the beads 17 in place so that they do not become loosened and fall off.

Figure 7:
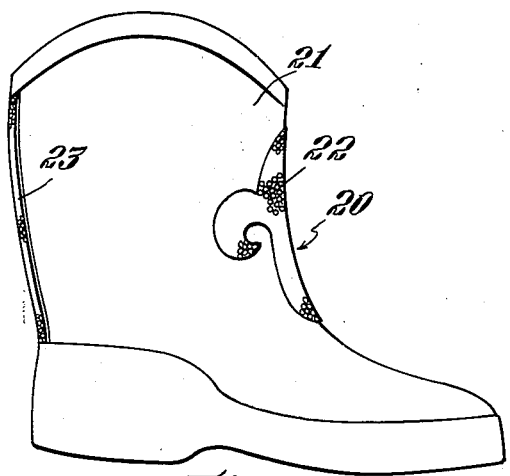
Fig. 7 is a side elevation, to smaller scale, of a boot similar to that of Fig. 1, but showing the reflecting areas as differently located.

The ornament 12 thus formed is preferably of a color contrasting with that of the other parts of the boot top. Any desired color may be imparted to the ornament 12 by coloring the varnish layers, for example by the use of an oil-soluble aniline dye, or by making the reflecting coating of the desired color by the employment of powdered material of the proper shade. While a contrasting color is desirable for ornamental effects, it is not necessary, in so far as the reflecting function is concerned. It is also to be understood that the particular configuration of the reflector 12 here illustrated, is by way of example only, and not an essential element of the invention. When the boot is worn and observed by daylight the reflecting character of the reflector 12 is not particularly evident, but when the boot is worn at night and is impinged by the beam from the headlight of an automobile, the ornament glows with great intensity due to the reflex action of the bead layer and contrasts vividly with the dark background provided by the boot top, and thus serves as a warning to the driver of the vehicle of the presence of a pedestrian in the road. While, as illustrated in Fig. 1, the ornament 12 is arranged at the side of the boot top, it is contemplated that it may be located at other portions, as shown, for example, in Fig. 7 where the boot 20 has the top 21 provided with a reflector 22 at its forward part and another reflector 23 at its rear part.

Figure 8:
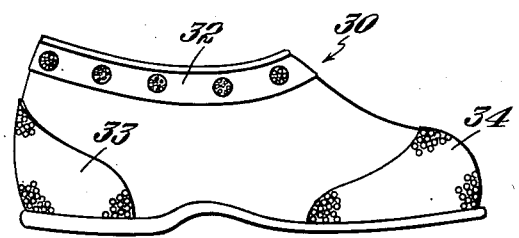
Fig. 8 is a side elevation of a rubber overshoe embodying the present invention.

It is likewise contemplated that the invention may be applied to rubber overshoes, as illustrated in Fig. 8, where the overshoe 30, which may be of conventional construction in other respects and which has the upper 31, is provided with the reflector band 32 near its top edge; with a second reflector 33 at its counter portion, and with a third reflector 34 at its toe portion.

While, as above suggested, it is desirable to provide a reflector layer behind the bead layer, this reflector layer may be dispensed with if desired, as illustrated in Fig. 6 wherein the rubber ply 15 is shown as having the single varnish layer 16 applied directly to its outer surface, the varnish layer 16 being that which binds the beads 17 to the ply 15. Such an arrangement provides a substantial degree of light reflection but lacks the full intensity resultant from the provision of a reflecting layer behind the bead layer.

Figure 5:
Fig. 5 is a section similar to Fig. 2, but showing a modified construction.

While for convenience it is preferred to applique the ornament to the boot top, it is possible to form the reflector directly on the boot top while the latter is in the uncured state. Thus as illustrated in Fig. 5, the knitted base fabric 13 has the outer coating 14 of rubber to which, before it is cured, the varnish layer 16ª is directly applied, this layer carrying the embedded beads 17ª. In making the boot in accordance with this modified practice, the desired area of the rubber coating 14 of the boot top would be coated with the varnish 16ª according to some predetermined pattern, for example, by the use of a roller die or otherwise, and then, after the varnish coating had been allowed to set, but while still tacky, as above described, the beads 17ª would be sprinkled, sifted or dusted over the tacky varnish coating and then the boot top would be vulcanized in usual way, thus causing the varnish coating to complete its setting and thereby binding the bead layer directly to the boot top.

While certain desirable embodiments of the invention have herein been illustrated and described by way of example, it is to be understood that the invention is broadly inclusive of any and all modifications falling within the terms of the appended claims.

I claim:

1. In combination in an article of rubber footwear of the kind wherein the top portion is elastically stretchable and comprises a textile base of knitted stockinet fabric coated on the outside with vulcanized rubber, a light-reflector mounted on said rubber coating, said reflector comprising an elastically stretchable supporting ply of vulcanized rubber integrally joined with the rubber coating of the elastically stretchable top, a layer of alkyd resin varnish permanently adherent to the outer surface of said rubber supporting ply, said layer of varnish being elastically stretchable, at least to the extent to which said top is elastically stretchable, and a layer of tiny glass beads, which are unaffected by any of the constituents of the varnish layer and which are socketed in said elastically stretchable varnish layer, the latter permanently bonding the beads to said elastically stretchable top regardless of repeated stretchings and contractions of the latter.

2. An article of rubber footwear according to claim 1 wherein a second layer of alkyd resin varnish, having stretch characteristics similar to those of the first-named varnish layer, is directly adherent to the rubber supporting ply, and a light-reflecting layer comprising a multitude of discrete solid particles, adherent to the outer surface of said second-named varnish layer and to which the bead-retaining varnish layer is permanently adherent.

3. In combination in a child's rubber boot of the kind which has an elastically stretchable top comprising knitted stockinet fabric coated on the outside with vulcanized rubber, an ornamental reflector, of an area substantially less than that of the top, arranged at the exterior of the top, said reflector being of a color which contrasts with the color of said rubber coating, when viewed by daylight, the reflector comprising a supporting-ply of rubber vulcanized to the rubber coating of the top and which is capable of stretching and contracting to substantially the same extent as said rubber coating, a coating of varnish, elastically stretchable, at least to the extent to which said rubber supporting ply is stretchable, and which is permanently adherent to the rubber supporting ply, said varnish coating containing aluminum powder thereby to provide a reflecting surface, a bonding layer of varnish, similar in elastic stretch characteristics, to said first varnish layer and which is permanently adherent to the latter, and a layer of tiny, transparent, glass beads individually socketed in said second varnish layer, the latter permanently gripping the beads so as to retain them regardless of repeated stretching and contraction of the boot top during wear.

ROLAND R. PEARSON.

REFERENCES CITED

The following references are of record in the file of this patent:

UNITED STATES PATENTS

| Number | Name | Date |
| --- | --- | --- |
| 2,153,755 | Higgins | Apr. 11, 1939 |
| 2,309,520 | McCandlish | Jan. 26, 1943 |
| 2,354,018 | Heltzer | July 18, 1944 |
| 2,555,715 | Tatum | June 5, 1951 |

FOREIGN PATENTS

| Number | Country | Date |
| --- | --- | --- |
| 737,776 | France | Oct. 10, 1932 |